No. 863,911.                                    PATENTED AUG. 20, 1907.
J. FITZGERALD.
COOKING UTENSIL.
APPLICATION FILED APR. 19, 1905.

WITNESSES:
C. N. Walker
Rudolph O. Howald

INVENTOR
James Fitzgerald
By C. Lundstrom
Attorney

UNITED STATES PATENT OFFICE.

JAMES FITZGERALD, OF LITTLE FALLS, NEW YORK.

COOKING UTENSIL.

No. 863,911.  Specification of Letters Patent.  Patented Aug. 20, 1907.

Application filed April 19, 1905. Serial No. 256,508.

*To all whom it may concern:*

Be it known that I, JAMES FITZGERALD, a citizen of the United States, residing at Little Falls, in the county of Herkimer and State of New York, have invented certain new and useful Improvements in Cooking Utensils, of which the following is a specification.

This invention relates to an improved culinary steamer and has for its object to provide a cooking utensil which may be used for boiling, stewing or steaming and which is adapted to distil the gravy or liquid essence and thereby retain the aroma of the same.

With these and other objects in view, the invention consists of an outer vessel in which the articles to be cooked and the required amount of water is placed; and a removable inner condenser vessel having a depending sheath or flange which is partially submerged in the water in the outer vessel and which telescopes therein, being supported from the top of the latter and provided with a dome-shaped partition that constitutes the bottom of the condenser cooling chamber and the top or condensing surface for the steaming chamber below. By this construction and arrangement of parts the water of condensation is not only returned to the original source of supply but the steam is prevented from escaping and an over-pressure thereof in the steaming chamber avoided.

Figure 1:
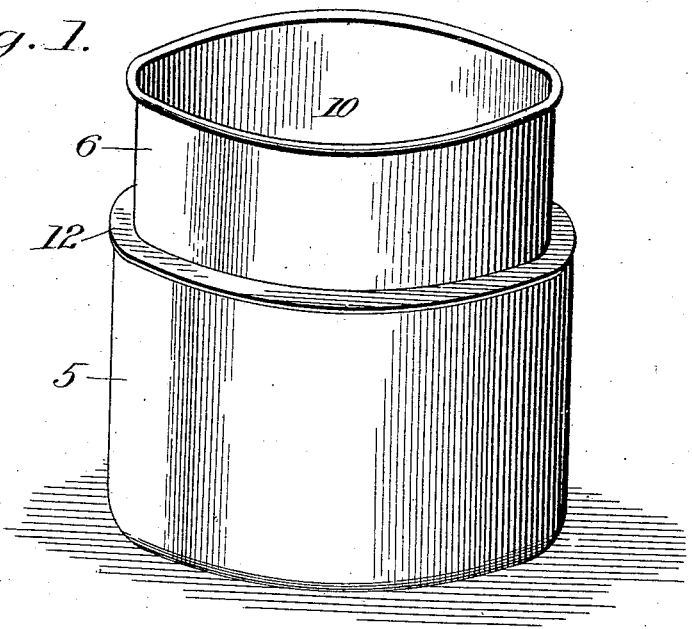
Figure 2:
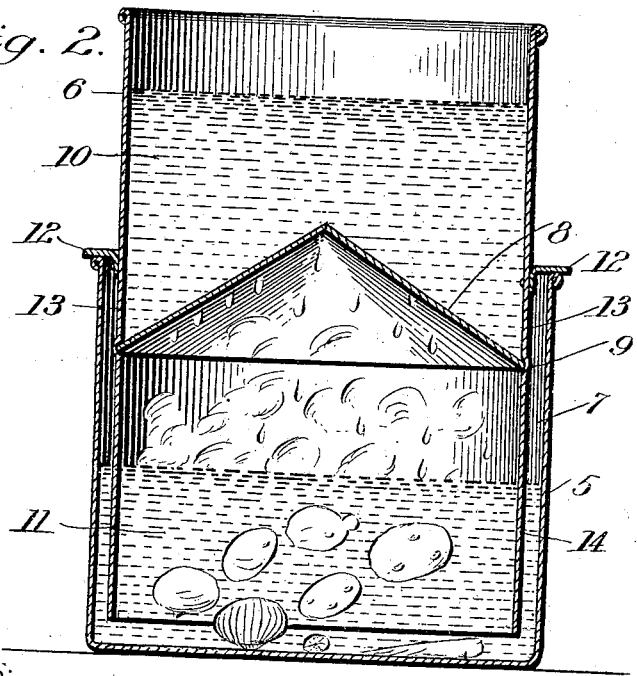

In the accompanying drawings, forming a part of this specification: Figure 1 is a perspective view of my improved cooking utensil, and Fig. 2 is a vertical section thereof.

In carrying out my invention, I employ an outer vessel 5 to receive the articles to be cooked. This vessel may be an ordinary pot, preferably cylindrical in shape, so as to properly fit over the hole of a cook stove. Associated with this outer vessel 5 is an inner condenser vessel 6 which is also preferably cylindrical and of less diameter than the outer vessel so as to leave an annular water chamber 7 between the contiguous surfaces of the vessels when the inner one is placed in position in the outer vessel. This telescoping inner vessel 6 is open at both ends but is provided at an intermediate point with a dome or cone-shaped imperforate partition 8, the edge of which fits into a groove 9 in the sides of the vessel, although this may be soldered or secured in any suitable manner. This partition forms a bottom for a condenser cooling chamber 10 in which cold water is placed, and also a cover and condensing surface for the cooking chamber 11 below. Its cone-shape establishes a steam dome or pocket so that any tendency of the pressure of steam to lift the inner chamber will result in an equal distribution of the pressure, the steam being, in a measure, confined to the center or apex of the partition and not more on one side than the other, and thus the inner vessel will not be tilted to one side. It is, however, the design to prevent any generation of steam sufficient to overcome the weight of the water in the condenser cooling chamber and to also avoid the water in the annular chamber 7 from being forced up to the top and out of the outer vessel. These contingencies are obviated by increasing the area of the condensing surface, which increase arises from the cone-shape, and which causes such a rapid condensation as to maintain substantially the original supply of water in the cooking chamber; and the area of the annular chamber 7 is such as to prevent the heavy column of water therein being forced up by the steam, in any event.

The inner vessel 6 is supported on the top of the outer vessel by a flange 12. This flange will also serve to prevent the escape of water in the annular chamber should the steam pressure ever be sufficient to force it up.

It will be noted that the partition 8 is jointed to the vessel 6 at a point below the flange 12 so as to provide a condensing surface 13 for any steam that might be generated in the annular chamber 7. It will be noted that the lower end of the inner vessel depends to a considerable extent in the outer vessel so as to form an inclosing sheath 14 for the sides of the cooking chamber 11 but it terminates short of the bottom of the outer chamber so as to permit the water therein to freely pass up into the annular chamber 7.

When the utensil is to be used, the articles to be cooked are placed in the outer vessel 5 and the required amount of water is then poured in. The inner vessel is then inserted and cold water poured into the condenser cooling chamber 10 which keeps the condenser 8 cold. As the articles are cooked, the steam generated in the cooking chamber will rise and contact with the partition 8, which being kept cool by the cold water in the chamber 10, will immediately condense the steam and the water of condensation will drop back into the cooking chamber and thus the steam is prevented from escaping and the aroma retained.

What is claimed as new and desired to be secured by Letters Patent is:

A cooking utensil comprising an outer vessel having a cooking chamber or reservoir, and an inner vessel having unrestricted open ends and provided with a circumferential groove intermediate its ends, and also provided with a removable cone-shaped partition having its periphery fitted in said groove, said partition constituting a bottom for the condensing and cooling chamber and a top for the cooking chamber therebelow, the inner chamber or reservoir being of the same diameter throughout its length and having an annular flange secured to its outer walls above the aforesaid circumferential groove for engagement with the upper edge of the outer vessel to support the former with respect to the latter, the inner and outer vessels being spaced apart to provide an annular water chamber between the contiguous surfaces of the vessel.

JAMES FITZGERALD.

Witnesses:
 RUDOLPH O. HORWALD,
 HENRY CHENEY.